United States Patent Office 3,348,913
Patented Oct. 24, 1967

3,348,913
PROCESS FOR RECOVERING POTASSIUM SULFATE FROM FINAL MOTHER LIQUORS OF KAINITE
Giacinto Veronica, Novara, Italy, assignor to Montecatini Edison S.p.A., Milan, Italy
No Drawing. Filed Jan. 7, 1964, Ser. No. 336,141
Claims priority, application Italy, Jan. 15, 1963, 909/63
4 Claims. (Cl. 23—121)

ABSTRACT OF THE DISCLOSURE

Production of potassium sulfate from kainite processing final mother liquors containing potassium, sodium, magnesium and in excess of 160 grams per liter of chlorine by dilution thereof with an aqueous solution of schoenite to form a solution containing less than 160 grams per liter of chlorine and a potassium content of in excess of 35 grams per liter, adding calcuim sulfate to precipitate syngenite and leaching the syngenite to form solid gypsum and a solution of potassium sulfate.

My invention relates to a process for recovering potassium sulfate from waste solutions obtained in the processing of potassium minerals, particularly kainite ($KCl \cdot MgSO_4 \cdot 3H_2O$).

According to my invention, potassium sulfate is recovered as syngenite ($K_2SO_4 \cdot CaSO_4 \cdot H_2O$) which is then treated with warm water to yield solid $CaSO_4$ and a solution of $K_2SO_4$. The solid $CaSO_4$ may then be reused.

In the copending U.S. application Ser. No. 137,752, filed Sept. 13, 1961, now Patent No. 3,198,601, a method is disclosed for precipitating potassium sulfate in the form of syngenite through the reaction of gypsum ($CaSO_4 \cdot 2H_2O$)

on the waste solutions (final mother liquors) obtained in kainite processing. This method involves using a suitable amount of syngenite crystals in the solution to be precipitated, to accelerate precipitation of syngenite. Without such acceleration, the method would be too time consuming to be adequate for industrial requirements.

As mentioned, the syngenite precipitation in the aforementioned method is dependent on the presence of a suitable amount of syngenite crystals which have the function of seeding the precipitation. While such seeding shortens the precipitation period to a few hours, it entails the drawback of requiring the recycling of solid syngenite which, generally, is present in large amounts. Hence adequate equipment for filtering, conveying, dosing, and feeding must be used, requiring burdensome apparatus and lengthy operations.

It is, therefore, an object of my invention to afford performing the syngenite precipitation process on an industrial scale with the aid of a greatly reduced amount of equipment yet under economically and qualitatively satisfactory conditions.

I have discovered that it is possible to obtain syngenite precipitation by the use of gypsum, on the final mother liquors (FML) obtained in kainite processing, in the absence of seeding crystals. This occurs when the $Cl^-$ concentration of the FML is reduced, while keeping the $K^+$ concentration constant or, in some cases, even increasing the $K^+$ concentration.

According to more specific features of the invention, this process is practiced by mixing the FML with aqueous solutions or suspensions of schoenite ($K_2SO_4 \cdot MgSO_4 \cdot 6H_2O$)

or other potassium salts not containing chlorine (except possibly in negligible amounts). Another way of practicing the invention is to mix the FML with intermediate lyes of the kainite processing, such as the so-called sulfate mother liquors (SML), either cold or warm, which are obtained in the step of leaching schoenite.

In syngenite precipitation carried out according to my invention it is immaterial that there is a solid phase present, i.e. schoenite. It is present either in the diluent (water + schoenite) or by reaction of FML and the diluting agent when the diluent is SML.

Syngenite precipitation rate is increased when at constant $Cl^-$ concentration in the liquid phase the $K^+$ concentration is increased. On the other hand, $K^+$ concentration remaining constant, the precipitation rate is much higher when the $Cl^-$ concentration is lower.

A specific mode of carrying out my invention, that results in an accelerated precipitation rate, is to add gypsum to the diluting agent and mix the slurry with the FML.

According to the invention, the solution to be precipitated is mixed with one or more of the aforementioned diluents, in such ratio that the resulting liquid phase has a $Cl^-$ concentration lower than 160 g./liter and a $K_2O$ concentration higher than 35 g./liter. Preferably, for example, the mixture is diluted to a chloride concentration of about 145 to about 155 g./liter and an initial $K_2O$ concentration of approximately 39 up to about 58 g./liter. Calcium sulfate is added to slight excess with respect to the precipitable potassium. The precipitable potassium is calculated as the difference between the entire amount of potassium sulfate present (either in the liquid phase or in the occasional solid phase), and the amount dissolved at equilibrium. This is in the order of 20-25 g./liter as $K_2O$.

I has been found that a proper reaction ratio is in the order of 1:2, between the molar amount of introduced $CaSO_4 \cdot 2H_2O$ and the molar amount of precipitable potassium sulfate, as defined above. It has further been found that a suitable working temperature is about 30° C.

As an alternative method of my invention, I have added gypsum to the diluent and then added the FML as described above.

The following examples of the process are described as illustrative of the invention, though not in a limiting sense.

Example 1

A waste solution (FML) of kainite processing, having the following composition,

| | G./liter |
|---|---|
| $K_2O$ | 38.62 |
| Na | 52.5 |
| Cl | 163.97 |
| Mg | 57.77 | when treated with calcium sulfate, in the absence of seeding by syngenite crystals, does not vary its $K_2O$ content substantially during a 10-hour period.

In fact, the potassium concentration of the liquid phase, determined as a function of time subsequent to the gypsum addition, has the following values:

| $K_2O$: | G./liter |
|---|---|
| After 2 hours | 36.97 |
| After 4 hours | 36.97 |
| After 6 hours | 36.59 |
| After 8 hours | 36.59 |
| After 10 hours | 36.59 |

The potassium concentration remains nearly constant. Hence it is apparent that this solution does not lend itself to profitable industrial application of the syngenite recovery process.

Now to 5 liters of the same solution, 100 g. schoenite (with 21% $K_2O$, 0.1% Cl) in 500 ml. water, and 180 g. $CaSO_4 \cdot 2H_2O$ are added.

The potassium concentration now attains the following values:

K$_2$O: G./liter
- After 1 hour — 39.15
- After 3 hours — 37.65
- After 5 hours — 33.43
- After 7 hours — 29.66
- After 9 hours — 28.61

Since the potassium concentration drops considerably, it is seen that syngenite precipitation occurs within 9 hours, this period being well suitable for industrial use of the process.

The reaction has now occurred in the presence of a liquid phase at a Cl$^-$ construction of 152.5 g./liter, as compared to the 164 g./liter of the preceding reaction, and an initial potassium concentration which is nearly the same in both reactions.

Example 2

The procedure of Example 1 is repeated, but now the same amount of gypsum is added to the solution of 100 g. schoenite in 500 ml. water and after about 30 minutes, 5 liters of the FML are added.

Potassium concentration in the liquid now attains the following values:

K$_2$O: G./liter
- After 2 hours — 30.12
- After 4 hours — 28.53
- After 6 hours — 27.03
- After 8 hours — 26.20
- After 10 hours — 25.90

The reaction rate is higher than in Example 1, while the liquid phase is maintained at the same Cl$^-$ concentration (152.5 g./liter).

Example 3

The precipitation is carried out according to the procedure of Example 2, while employing as a diluent a suspension of 250 g. schoenite in 500 ml. water to which 250 g. of gypsum and subsequently 5 liters of FML are added.

The potassium concentration of the liquid phase varies as follows:

K$_2$O: G./liter
- After 2 hours — 26.65
- After 4 hours — 25.07
- After 6 hours — 24.69
- After 8 hours — 24.02
- After 10 hours — 23.56

The reaction rate is further increased with respect to Example 2 and a higher initial potassium concentration occurs, the chlorine concentration being the same as in Example 2.

Example 4

The procedure of Example 3 is repeated with the exception that 750 ml. of water rather than 500 ml. are employed as diluent, and 236 g. of gypsum rather than 250 g.

The potassium precipitation from the liquid phase shows the following course:

K$_2$O: G./liter
- After 2 hours — 25.07
- After 4 hours — 24.69
- After 6 hours — 23.56
- After 8 hours — 23.34
- After 10 hours — 23.34

A further increase of the reaction rate is observed in comparison with the preceding example, since the reaction occurs initially with a liquid phase of lower Cl$^-$ concentration (146 g./liter as compared to 152.5).

Example 5

To 5 liters of FML of Example 1, 500 ml. of a solution (SML) in equilibrium with schoenite at 15° C., having the composition:

| | G./liter |
|---|---|
| K$_2$O | 58 |
| Na | 1 |
| Mg | 36 |
| Cl | 8 |
| SO$_4$ | 192 | are added. To this 140 g. of gypsum are then added.

Potassium concentration of the liquid phase varies as follows:

K$_2$O: G./liter
- After 2 hours — 39.61
- After 4 hours — 33.13
- After 6 hours — 30.12
- After 8 hours — 28.08
- After 10 hours — 28.08 with a Cl$^-$ concentration of 148.3 g./liter.

Example 6

The procedure of Example 5 is repeated while adding the gypsum to the SML and thereafter diluting with FML. Potassium concentration results as follows:

K$_2$O: G./liter
- After 2 hours — 31.91
- After 4 hours — 26.95
- After 6 hours — 25.45
- After 8 hours — 24.86
- After 10 hours — 24.86

Substantially the same results are obtained while employing as a diluent SML in equilibrium with sulfate; for example, SML at 48.5° C., which has the following composition:

| | G./liter |
|---|---|
| K$_2$O | 92 |
| Na | 0–2 |
| Mg | 44 |
| Cl | 0–8 |
| SO$_4$ | 268–261 |

I claim:
1. The method of producing potassium sulfate from final mother liquors (FML) of kainite KCl·MgSO$_4$·3H$_2$O processing, obtained by leaching kainite, containing K$^+$, Na$^+$, MG$^{++}$, Cl$^-$, SO$^{--}$ ions and having a Cl$^-$ concentration higher than 160 g./liter, which comprises the steps of diluting said final mother liquors in aqueous mixtures of schoenite K$_2$SO$_4$·MgSO$_4$·6H$_2$O, the resulting liquid phase having a chloride concentration less than 160 g./liter and an initial K$_2$O concentration at least 35 g./liter, adding gypsum CaSO$_4$·2H$_2$O in order to precipitate the potassium present in the form of syngenite K$_2$SO$_4$·CaSO$_4$·H$_2$O, separating and leaching said syngenite in order to recover solid gypsum and a solution of potassium sulfate.

2. The method of claim 1, wherein the resulting liquid phase has a chloride concentration from 145 g./liter to 155 g./liter and an initial K$_2$O concentration from 35 g./liter to 58 g./liter.

3. The method of producing potassium sulfate from final mother liquors of kainite processing, obtained by leaching kainite, containing K$^+$, Na$^+$, Mg$^{++}$, Cl$^-$, SO$^{--}$ ions and having a Cl$^-$ concentration higher than 160 g./liter, which comprises the steps of diluting said final mother liquors in a solution of sulfate mother liquors (SML) in equilibrium with schoenite, having a composition in g./liter of K$_2$O 58, Na$^+$ 1, Mg$^{++}$ 36, Cl$^-$ 8, SO$_4$$^{--}$ 192, the resulting liquid phase having a chloride concentration between from 145 g./liter to 155 g./liter, and an initial K$_2$O concentration from 35 g./liter to 58 g./liter, adding gypsum in order to precipitate the potassium present in the form of syngenite, separating and leaching said syngenite in order to recover solid gypsum and a solution of potassium sulfate.

4. The method of producing potassium sulfate from final mother liquors of kainite processing, obtained by leaching kainite, containing $K^+$, $Na^+$, $Mg^{++}$, $Cl^-$, $SO^{--}$ ions and having a $Cl^-$ concentration higher than 160 g./liter, which comprises the steps of adding gypsum to sulfate mother liquors in equilibrium with schoenite and thereafter diluting with final mother liquors in order to give a resulting liquid phase having a chloride concentration between at least 145 g./liter and at most 155 g./liter and an initial $K_2O$ concentration between at least 35 g./liter and at most 58 g./liter and precipitate the potassium present in the form of syngenite.

References Cited

UNITED STATES PATENTS 3,198,601   8/1965   Veronica et al. _____ 23—121

EARL C. THOMAS, *Primary Examiner.*